May 30, 1967  J. A. LEWIS  3,322,476
BUSHING AND SEAL REPAIR KIT AND METHOD
FOR INSTALLING THE SAME
Filed April 2, 1965 2 Sheets-Sheet 1
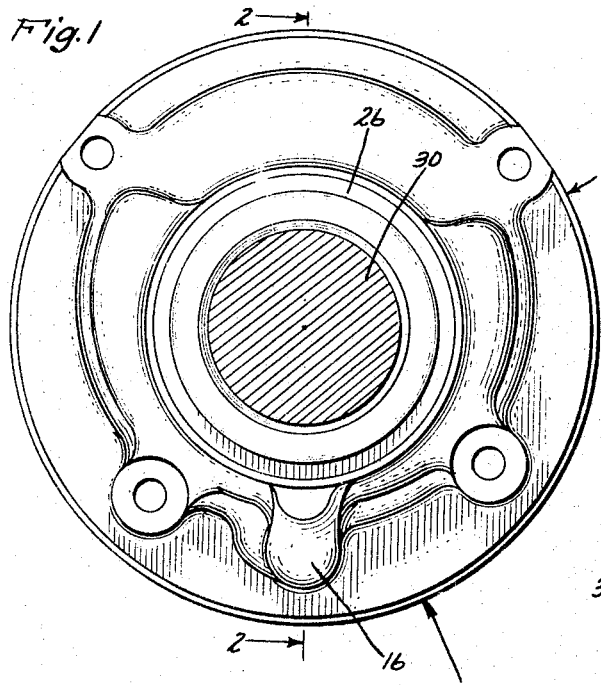
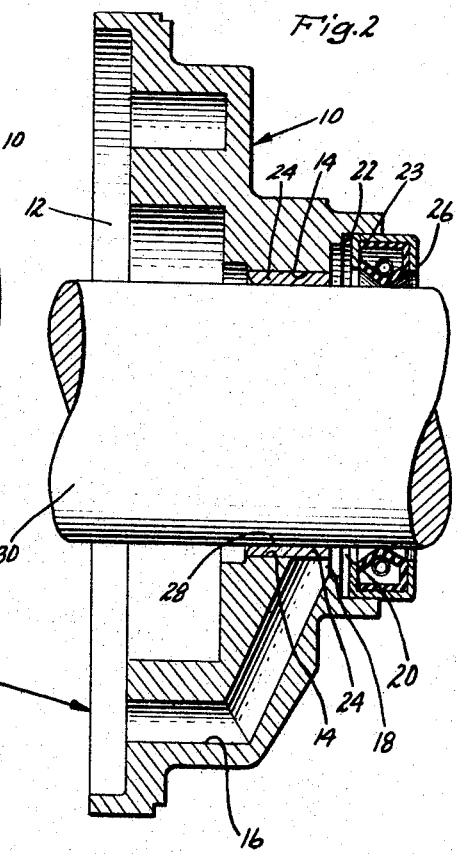
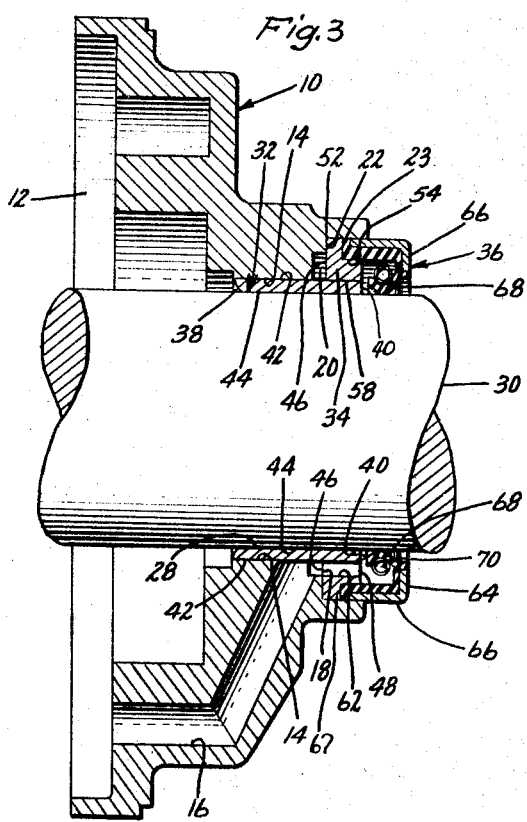
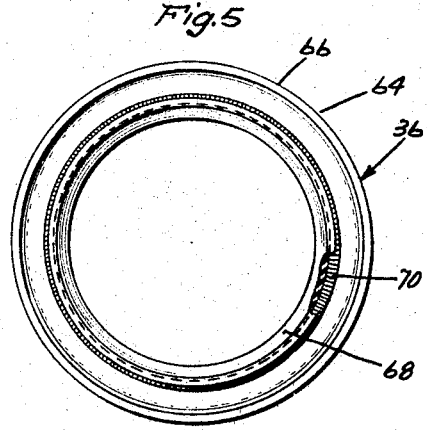
Inventor:
Jess A. Lewis,
by Hood, Gust & Irish
Attorneys.

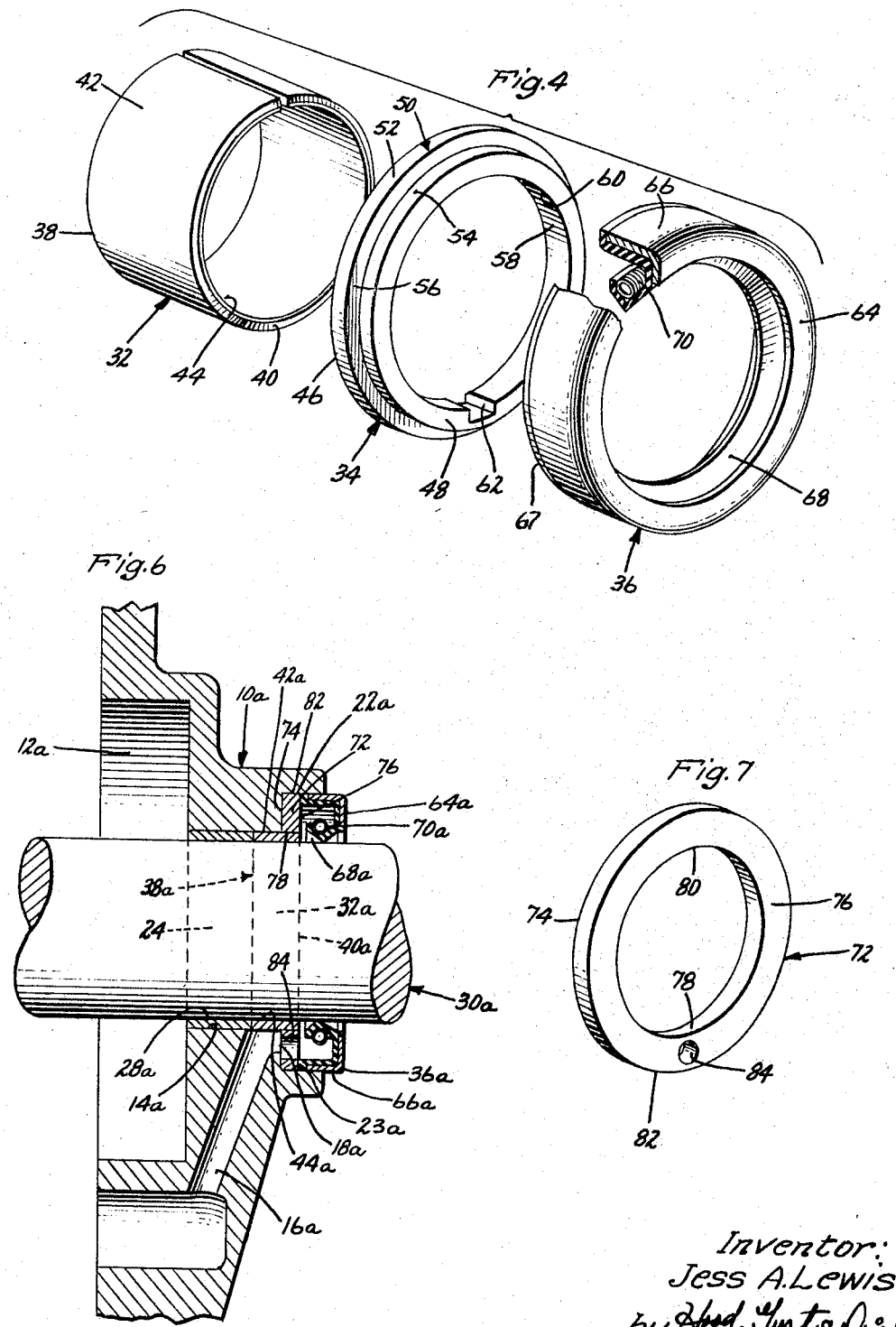

United States Patent Office 3,322,476
Patented May 30, 1967

3,322,476
BUSHING AND SEAL REPAIR KIT AND METHOD
FOR INSTALLING THE SAME
Jess A. Lewis, 1230 Dell Cove Drive,
Fort Wayne, Ind. 46804
Filed Apr. 2, 1965, Ser. No. 445,185
8 Claims. (Cl. 308—36.1)

The present invention relates generally to an improved bushing and seal repair kit and a method for installing the same, and more particularly, to an improved torque converter shaft bushing and front oil pump seal repair kit for an automotive automatic transmission and a method for installing the same in the housing of the front oil pump.

Since the torque converter shaft of an automotive automatic transmission rotates whenever the engine of the vehicle is running, it is a common occurrence for the bushing located in the housing of the front oil pump to become worn to such a degree that the converter shaft is undersized thereby permitting the shaft to move in the bearing. Whenever such wear occurs, it is common to find that the oil seal is worn and has become hard with age and the converter shaft is grooved or scored both by the worn bushing and oil seal whereby transmission fluid is allowed to leak past the seal. Prior to the present invention, it has been customary to repair a transmission having this defect by dismounting the housing of the front pump from the crank case to which it is secured and replacing the worn bushing with a new bushing and the worn oil seal with a new oil seal both having dimensions and characteristics similar to the respective worn parts. However, such a method of replacement of the worn bushing and oil seal is relatively expensive, and many times does not cure the defect since the torque converter shaft is usually mutilated by the worn bushing and oil seal before the replacement thereof and the mutilation of the shaft causes an accelerated wear to occur on the new bushing and oil seal thereby causing the same defect to occur only a short time after the replacement of the worn bushing and the worn oil seal. Therefore, it is desirable to provide an improved bushing and oil seal repair kit which can be relatively inexpensively mounted in the housing of the front pump of an automatic transmission as a replacement for the worn bushing and oil seal above-mentioned, and which prevents the torque converter shaft from moving in the bushing and the transmission fluid from leaking out of the crank case in a relatively permanent manner.

It is therefore an object of this invention to provide an improved torque converter bushing and oil seal repair kit which can be relatively easily and inexpensively mounted in the housing of the front pump of an automatic transmission to replace a worn bushing and oil seal.

Another object of this invention is to provide an improved torque converter bushing and oil seal repair kit which, when used to replace a worn bushing and oil seal in the front pump of an automatic transmission, provides a greater bushing surface in contact with the torque converter shaft than the original equipment or other replacement parts and which relatively permanently prevents oil from leaking out of the crank case of the automatic transmission.

Yet another object of this invention is to provide an improved torque converter shaft bushing and oil seal repair kit which provides a bushing having a larger area in contact with the torque converter shaft than original equipment or other replacement bushings and a bushing and oil seal which contacts a portion of the shaft's surface heretofore not contacted by the worn bushing and oil seal.

Still another object of this invention is to provide a method by which the worn bushing and oil seal of the front pump of an automatic transmission can be relatively easily and inexpensively replaced.

A further object of this invention is to provide an improved method for replacing the worn bushing and oil seal in the front pump of an automatic transmission with a bushing having a greater bearing surface and a bushing and oil seal which contacts a portion of the torque converter shaft not heretofore contacted by the worn bushing and oil seal.

Still further an object of this invention is to provide a replacement bushing which can be installed in the housing of the front pump of an automatic transmission, relatively easily and inexpensively, which increases the bearing surface over that which was originally provided.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a front view of the housing of the front pump of a Fordomatic automatic transmission showing the converter shaft in cross-section and the oil seal as originally installed;

FIG. 2 is a fragmentary view, partially in cross-section, of the pump housing and converter shaft, illustrated in FIG. 1, showing the converter shaft bushing and oil seal as originally installed;

FIG. 3 is a view similar to that shown in FIG. 2 illustrating the bushing, spacer and oil seal of this invention installed in the housing of a front pump of a Fordomatic automatic transmission;

FIG. 4 is an exploded and perspective view of the bushing, spacer and oil seal of this invention;

FIG. 5 is a rear view of the oil seal of this invention;

FIG. 6 is a view similar to that shown in FIGS. 2 and 3 of the housing of the front pump of a Torqueflite automatic transmission with the bushing, spacer and oil seal of a second embodiment of this invention installed therein; and FIG. 7 is a perspective view of the spacer used in the second embodiment of this invention.

In the broader aspects of this invention there is provided a spacer which is frictionally secured in the cavity of the housing of a front pump of an automatic transmission formed by removal of a worn oil seal and bushing, a new bushing frictionally secured in the housing and spacer, and a new oil seal frictionally secured adjacent the spacer in the cavity of the pump housing aforementioned. The new bushing surface provided is partially supported by the pump housing and partially supported by the spacer and is axially longer than the worn bushing thereby having a longer bearing surface which contacts a portion of the converter shaft, which is journaled in the bushing, which was not contacted by the worn bushing.

The broad aspects of this invention further include a method of installing the bushing and oil seal of the invention comprising the steps of: first, removing the worn oil seal from the housing of the front pump of an automatic transmission; second, providing an annular spacer having an aperture therein and a second opening therein communicating with the ends thereof; third, securing the spacer in the housing with the aperture in registry with the cylindrical bushing-supporting surface of the housing thereby to form a continuation thereof and with the second opening of the spacer in registry with the oil drain of the housing; fourth, providing a new bushing longer than the worn bushing; fifth, securing the new bushing in the aperture of the spacer and the bearing-supporting surface of the housing with one end of the new bushing flush with one end of the spacer and with the new bushing being supported by the spacer and the housing; sixth, providing a new oil seal; seventh, securing the new oil seal in the housing adjacent to and spaced-apart from the spacer and the bushing whereby a converter shaft can be journaled in the bushing and the oil lubricating the bushing and the shaft will be retained within the housing, the excess oil passing between the shaft and the bushing being returned to the interior of the housing by a second opening and the oil drain in the housing.

Referring now to the drawings, and more specifically to FIGS. 1 and 2, there is shown a front pump housing 10 of a Fordomatic automatic transmission having an interior 12, a bushing-supporting surface 14, an oil drain 16 which communicates with the surface 14 at an opening 18, and a cavity 20 communicating with the exterior of the housing 10 and extending inwardly to the bushing-supporting surface 14. The cavity 20 is bottomed by a step communicating with both the surface 14 and the interior surface of cavity 20. The bushing 24 installed in the pump housing 10 as original equipment has an axial length substantially equal to the axial length of surface 14 and has its exterior surface in intimate contact therewith, as shown in FIG. 2. Secured to housing 10 in this manner, bushing 24 is supported by housing 10. Frictionally secured within cavity 20 and adjacent to the bottom or step 22 thereof is an oil seal 26. Oil seal 26 is spaced-apart from the bushing 24 thereby allowing communication between the interior bushing surface 28 and the oil drain 16 when the oil seal 26 is properly installed. Journaled within the bushing 24 is a torque converter shaft 30 which is lubricated as it rotates in the bushing 24 by the oil within the pump housing 10 which passes between the shaft 30 and the surface 28 of the bushing 24 and into cavity 20. This oil, upon entering cavity 20, is returned to the interior 12 of the housing 10 by means of the oil drain 16. Thus far described, the structure is all conventional and is used in many automatic transmissions currently being commercially produced. While structure of a specific automatic transmission has been illustrated and described, there are several automatic transmissions which have similar structure which does not deviate greatly from that shown in the drawings. Each of these automatic transmissions have a pump housing in which a converter shaft is journaled and in which a bushing is supported by the housing, the bushing being lubricated by oil passing between the bushing and the shaft into a cavity defined by the housing and an oil seal, and then, returned to the interior of the housing by an oil drain. While two embodiments of this invention will be described herein, this invention is usuable in any automatic transmission having the general structure above-described.

Referring now specifically to FIGS. 3, 4 and 5, a first embodiment of this invention which is adapted to be installed in the pump housing of a Fordomatic transmission, such as that illustrated in FIGS. 1 and 2, will now be described. This embodiment of this invention comprises a bushing 32, a spacer or bearing support ring 34, and an oil seal 36. Bushing 32 is cylindrical in shape having opposite ends 38, 40, an exterior surface 42, and an interior surface 44. Bushing 32 is dimensioned substantially identically with the bushing 24 previously mentioned except that the axial length of the bushing 32 is substantially longer than the axial length of the original bushing 24 and the surface area of the surfaces 42, 44 are thus substantially larger than the comparable surfaces of the bushing 24.

Spacer 34 is annular in shape having opposite ends 46, 48, a step-dimetered exterior surface 50 having a first surface portion 52 with a diameter substantially identical with the diameter of the interior housing surface 23 which defines the cavity 20 afore-described, and a second surface portion 54 separated from the first surface portion 52 by a step 56 of a diameter smaller than the diameter of portion 52. Spacer 34 has a coaxial aperture 58 therein having an interior surface 60 which has a diameter substantially the same as that of the surface 14 of the housing 10. Communicating with the ends 46, 48 and the surface 60 is a groove 62, the purpose of which will be described hereinafter.

Seal 36 is of the type commercially available and generally comprises an annular outer rigid metal ring 64 and an inner flexible ring 68 coaxially secured therein. Ring 64 has an exterior surface 66 which has a diameter substantially the same as surface portion 52 of the spacer 34. Ring 68 has an interior diameter smaller than the diameter of the torque converter shaft 30, but is constructed such that shaft 30 may be inserted in the ring 68 by flexing the ring 68 radially outwardly toward the ring 64. When installed on the shaft 30, the ring 68 is resiliently held to the surface of the shaft 30. In a specific embodiment of the seal 36, there is provided a continuous coil spring 70 in the ring 68 to increase the resiliency of the ring 68.

Referring now specifically to FIGS. 2 and 3, the method of installing the bushing 32, the spacer 34, and the oil seal 36 of this invention in the housing 10 will now be described. First, the worn oil seal 26 is removed, thereby exposing cavity 20 in the housing 10. Second, the worn bushing 24 is removed from the housing 10 thereby exposing the bushing-supporting surface 14 of the housing 10. Third, the spacer 34 is frictionally secured in cavity 20 with surface portion 52 and end 46 abutting the step 22 of the housing 10, the surface portion 52 engaging the interior housing surface 23, and the surface portion 54 of the end 48 spaced from the exterior of the housing. Thus secured, the interior surface 58 of the aperture 60 is in registry with the interior surface 14 of the housing 10 and forms a continuation thereof. When properly positioned in housing 10, the groove 62 of the spacer 34 is in registry with opening 18 of the oil drain 16. Fourth, the bushing 32 is frictionally secured in the housing 10 and the aperture 58 of the spacer 34 with end 40 of the bushing 32 flush with end 48 of spacer 34. Thus secured in the housing 10, bushing 32 extends from end 48 of spacer 34 inwardly toward the interior 12 of housing 10 and contacts the entire area of the surface 58 of spacer 34 and of the interior surface 14 of housing 10, and is supported both by housing 10 and by spacer 34. Fifth, the oil seal 36 is frictionally secured in cavity 20 adjacent to spacer 34 by frictionally engaging surface 66 of seal 36 to the housing surface 23. As shown in FIG. 3, a portion of the ring 64 of the oil seal 36 is positioned within the annular opening defined by the surface portion 54 of spacer 34 and the interior surface 23 of cavity 20 and the end 67 thereof abuts step 56 of spacer 34. However, the flexible ring 68 is spaced from both bushing 32 and end 48 of spacer 34 thereby permitting communication between the surface of shaft 30 intermediate bushing 32 and the flexible ring 68 and the oil drain 16 and contacts a portion of the shaft 30 not heretofore contacted by oil seal 26.

Now referring to FIGS. 6 and 7, a second embodiment of this invention, which is especially adapted to be installed in a Torqueflite automatic transmission, will be described. This second embodiment of the invention differs from the first embodiment only in the construction of the spacer 72, illustrated in FIG. 7, and the dimensions of the bushing 32 and seal 36 necessitated by the different dimensions of housing 10, shaft 30, and by the different method of installing the bushing in the housing 10 as will be described hereinafter. To denote these different dimensional differences, those elements which are identical to the elements above-described with respect to the first embodiment of this invention, except for the dimensions thereof, will be referred to by the same reference numeral and a suffix "a."

Referring now to FIGS. 6 and 7, there is shown the spacer 72 which is used in the second embodiment of this invention in place of the spacer 34 above-described. Spacer 72 is annular in shape having opposite ends 74, 76, a constant diametered coaxial aperture 78 therein communicating with the ends 74, 76 and having a surface 80, and a constant diametered exterior surface 82. Communicating with ends 74, 76 is a second opening 84, the purpose of which is identical to groove 62 of the first embodiment of this invention and which will be described hereinafter.

Referring now to FIG. 6, the method of installing the busing 32a, the spacer 72, and the oil seal 36a of this invention will now be described. First, the worn oil seal 26a is removed from the housing 10a thereby exposing the cavity 20a in housing 10. Second, the spacer 72 is frictionally secured in cavity 20a with the end 74 adjacent to the step 22a, with the other end 76 spaced from the exterior of the housing 10a, and with the exterior surface 82 in contact with housing interior surface 23a. Thus secured, the aperture 78 is in registry with the bushing-supporting surface 14a of the housing 10a and forms a continuation thereof. When properly secured, the opening 84 of spacer 72 will be in registry with opening 18a of oil drain 16a of the housing 10a. Third, moving the worn bushing 24a inwardly toward the interior 12a of the housing 10a away from cavity 20a until the inner end of the bushing 24a is flush with the interior surface of the housing 10a which surrounds the communication of the surface 14a with the interior 12a, thereby exposing a portion of the interior surface 14a adjacent to the step 22a. Fourth, frictionally securing the new bushing 32a in the aperture 78 of the spacer 72 and the surface 14a of the housing 10a with the end 38a abutting the other end of the worn bushing 24a and the other end 40a flush with the end 76 of spacer 72. Thus secured in the spacer 72 and the housing 10a, the bushing 32a is supported by both the housing 10a and the spacer 72. Fifth, frictionally securing the oil seal 36a in the cavity 20a abutting the end of spacer 72 last-mentioned. Thus secured, the ring 66a of the seal 36a is positioned abutting end 76 of spacer 72 and the flexible ring 68a of the oil seal 36a is spaced from the bushing 32a and the ring 72 thus providing communication between the exterior surface of shaft 30a, intermediate the ring 72 and the bushing 32a and the oil seal 36a, and the oil drain 16a of the housing 10a through the openings 84 and 18a, thereby allowing the oil which lubricates the shaft 30a and the bushings 14a, 32a to be returned from the cavity 20a to the interior 12a of the housing 10a by means of the oil drain 16a as in the first embodiment of this invention. Thus secured, oil seal 36a contacts a portion of the shaft 30a not heretofore contacted by oil seal 26a.

In a specific embodiment of this invention, the bushings 32, 32a are made of steel with an interior layer of bearing metal secured thereto; the spacers 34, 72 are made of steel; the rigid rings 66, 66a of the oil seals 36, 36a are made of steel; and the interior flexible rings 68, 68a of the oil seals 36, 36a are made of a rubber-like material. Neoprene has proven to be a satisfactory rubber-like material for the rings 68, 68a and babbit metal has proven to be a satisfactory bearing metal for the interior layer of bushings 32, 32a.

In operation, both embodiments of this invention function similarly to provide an improved bushing and oil seal replacement respectively for the worn bushing and oil seal provided as original equipment. With the converter shaft 30, 30a journaled in the bushings 32, 32a a portion of the new bearing surface 44, 44a and the interior flexible rings 68, 68a of the oil seals 36, 36a of each embodiment, respectively, contacts a different portion of the surface of the shafts 30, 30a than previously contacted by the bushings 24, 24a and oil seals 26, 26a, respectively. This provides that any multilation of the shafts 30, 30a by the worn bushings 24, 24a and oil seals 26, 26a does not prevent successful repair using the bushing and oil seal of this invention herein described; and further, does not result in the accelerated wear of the new bushings 32, 32a and oil seals 36, 36a, which, as aforementioned, has been a problem with prior replacement bushing and oil seals. Further, the bushing 32 in the first embodiment and the bushing 32a in combination with the old bushing 24a in the second embodiment provide an increased bearing surface which results in the repaired bearing being more permanent than the bearing originally installed.

While there have been described above the principles of this invention in connection with specific apparatus, it is to be clearly understood that this description is made only by way of example and not as a limitation to the scope of this invention.

What is claimed is:

1. The combination of an automatic transmission torque converter pump housing having a step-diametered opening therein, said opening having an interior portion of a constant first diameter, an exterior portion of a constant second diameter and a step therebetween, said second diameter being larger than said first diameter thereby defining an annular cavity in said housing surrounding said opening which is accessible from the exterior of said housing and is bounded on one side by said step, said housing having an oil drain communicating with the interior of said housing and said exterior portion of said opening, a bearing support ring having opposite ends, a constant diametered and coaxial aperture therein with a diameter substantially equal to said housing opening first diameter and an exterior surface portion having a diameter substantially equal to said housing opening second diameter, said ring being positioned and frictionally secured in said housing cavity with one of said ends thereof positioned adjacent said step, said support ring aperture being in registry with said interior portion of said housing opening thereby forming a continuation thereof, said ring having a second opening therein communicating with said ends of said ring and in registry with said oil drain, thereby forming a continuation of said oil drain, a cylindrical bushing having an exterior diameter substantially equal to said housing opening first diameter, said bushing being positioned in said housing interior opening and said support ring aperture and being frictionally secured therein with said bushing being supported by said housing and said ring, and an annular oil seal having an outer rigid ring and an inner flexible ring secured coaxially together, said outer ring having a cylindrical surface defining the outer peripheral surface of said seal, said outer seal surface having a diameter substantially equal to said housing opening second diameter, said seal being positioned and frictionally secured in said cavity with one end thereof adjacent said other end of said ring, thereby providing access from the interior of said bushing and seal to said passageway, whereby a converter shaft can be journaled in said bushing and the oil lubricating said bushing and the shaft is retained within said pump housing and the excess oil returned to the interior of said pump housing by said oil drain.

2. The combination of an automatic transmission torque converter pump housing having a step-diametered opening therein, said opening having an interior portion of a constant first diameter, an exterior portion of a constant second diameter and a step therebetween, said second diameter being larger than said first diameter thereby defining an annular cavity in said housing surrounding said opening which is accessible from the exterior of said housing and is bounded on one side by said step, said housing having an oil drain comunicating with the interior of said housing and said exterior portion of said opening, a bearing support ring having opposite ends, a constant diametered and coaxial aperture therein with a diameter substantially equal to said housing opening first diameter, and a step diametered exterior surface, said exterior surface having a first portion having a diameter substantially equal to said housing opening second diameter, a second portion having a third diameter intermediate said first and second diameters and a step therebetween, said ring being positioned and frictionally secured in said cavity of said housing with one of said ends and said first portion adjacent to said step of said housing, said aperture being in registry with said interior portion of said housing opening thereby forming a continuation thereof, said ring having a groove therein communicating with said ends of said ring and said aperture and in registry with said oil drain, a cylindrical bushing having an exterior diameter substantially equal to said housing opening first diameter, said bushing being positioned in said interior portion of said housing opening and said ring aperture and being frictionally secured therein with said bushing being supported by said housing and said ring, and an annular oil seal having an outer rigid ring and an inner flexible ring secured coaxially together, said outer ring having a cylindrical surface defining the outer peripheral surface of said seal, said outer seal surface having a diameter substantially equal to said housing opening second diameter, said seal being positioned and frictionally secured in said cavity with one end thereof adjacent said other end and said second portion of said ring, thereby providing communication between the interior of said bushing and seal and said oil drain, whereby a converter shaft can be journaled in said bushing and the oil lubricating the shaft and bushing is retained by said seal within said pump housing and the excess oil returned to the interior of said pump housing by said oil drain.

3. In an automatic transmission of the class wherein a torque converter has a front oil pump housing secured to the transmission crank case and having a step-diametered opening therein which has an interior portion of a constant first diameter, an exterior portion of a constant second diameter, and a step therebetween, said second diameter being larger than said first diameter thereby defining an annular cavity in said housing surrounding said opening which is accessible from the exterior of said housing and is bounded on one side thereof by said step, said housing having an oil drain communicating with the interior of said housing and said exterior portion of said opening, the combination with said pump housing of a bearing support ring having opposite ends, a constant diametered and coaxial aperture therein with a diameter substantially equal to said housing opening first diameter and an exterior surface portion having a diameter substantially equal to said housing opening second diameter, said ring being positioned and frictionally secured in said cavity in said housing with one of said ends thereof positioned adjacent to said step, said aperture being in registry with said interior portion of said housing opening thereby forming a continuation thereof, said ring having a second opening therein communicating with said ends of said ring, and in registry with said oil drain, thereby forming a continuation of said oil drain, a cylindrical bushing having an exterior diameter substantially equal to said housing opening first diameter, said bushing being positioned in said interior portion of said housing opening and said ring aperture and being frictionally secured therein with said bushing being supported by said housing and said ring, and an annular oil seal having an outer rigid ring and in inner flexible ring secured coaxially together, said outer ring having a cylindrical surface defining the outer peripheral surface of said seal, said seal surface having a diameter substantially equal to said housing opening second diameter, said seal being positioned and frictionally secured in said cavity with one end thereof adjacent said other end of said ring, thereby providing access from the interior of said bushing and seal to said passageway, whereby a converter shaft can be journaled in said bushing and the oil lubricating said bushing and the shaft is retained within said pump housing and the excess oil returned to the interior of said pump housing by said oil drain.

4. In an automatic transmission of the class wherein the torque converter has a front oil pump housing secured to the transmission crank case having a step-diametered opening therein which has an interior portion of a constant first diameter, an exterior portion of a constant second diameter, and a step therebetween, said second diameter being larger than said first diameter thereby defining an annular cavity in said housing surrounding said opening which is accessible from the exterior of said housing and is bounded on one side thereof by said step, said housing having an oil drain communicating with the interior of said housing and said exterior portion of said opening, the combination with said pump housing of a bearing support ring having opposite ends, a constant diametered and coaxial aperture therein with a diameter substantially equal to said housing opening first diameter, and a step-diametered exterior surface, said exterior surface having a first portion having a diameter substantially equal to said housing opening second diameter, a second portion having a third diameter intermediate said first and second diameters and a step therebetween, said ring being positioned and frictionally secured in said cavity of said housing with one of said ends and said first portion adjacent to said step of said housing, said aperture being in registry with said interior portion of said opening thereby forming a continuation thereof, said ring having a groove therein communicating with said ends of said ring and said aperture and in registry with said oil drain, a cylindrical bushing having an exterior diameter substantially equal to said housing opening first diameter, said bushing being positioned in said interior portion of said housing opening and said ring aperture and being frictionally secured therein with said bushing being supported by said housing and said ring, and an annular oil seal having an outer rigid ring and an inner flexible ring secured coaxially together, said outer ring having a cylindrical surface defining the outer peripheral surface of said seal, said outer seal surface having a diameter substantially equal to said housing opening second diameter, said seal being positioned and frictionally secured in said cavity with one end thereof adjacent said other end and said second portion of said ring, thereby providing communication between the interior of said bushing and seal and said oil drain, whereby a converter shaft can be journaled in said bushing and the oil lubricating the shaft and bushing is retained by said seal within said pump housing and the excess oil returned to the interior of said pump housing by said oil drain.

5. The method of replacing a worn torque converter shaft bushing and a front oil pump seal of an automatic transmission with a longer bushing and a new seal comprising the steps of: removing the worn oil seal from the housing of the front pump thereby exposing a cavity in said housing, providing a bearing support ring having opposite ends, a constant diametered coaxial aperture therein, an exterior surface having a constant diametered surface portion with a diameter substantially equal to the exterior diameter of said worn front seal, and a second opening therein communicating with said ends, securing said ring in said cavity of said housing adjacent to the bottom thereof and spaced from the opening of said cavity with said aperture in registry with the cylindrical bushing-supporting surface of said housing thereby forming a continuation thereof, and with said second opening in registry with the oil drain of said housing, providing a new cylindrical bushing having an exterior diameter substantially equal to the diameter of said ring aperture, securing said new bushing in said aperture of said ring, said new bushing being supported by said ring, providing a new annular oil seal having an outer rigid ring and an inner flexible ring secured coaxially together, said outer ring having a cylindrical surface defining the outer peripheral surface of said seal, said seal surface having a diameter substantially equal to the diameter of said portion of said exterior ring surface, securing said seal in said cavity in a position to contact a portion of the converter shaft not previously contacted by said worn oil seal whereby the converter shaft can be journaled in said bushing and the oil lubricating said bushing and shaft is retained within said pump housing and the excess oil returned to the interior of said pump housing by said oil drain.

6. The method of claim 5 wherein the step of securing said new bushing in said aperture further comprises the step of moving the worn bushing in said housing away from said cavity thereby providing space for said new bushing adjacent to the worn bushing, said new bushing being supported by said ring and said housing, a portion of said worn bushing and said new bushing, respectively, contacting portions of the converter shaft not previously contacted by said worn bushing.

7. The method of replacing a worn torque converter shaft bushing and a front oil pump seal of an automatic transmission with a longer bushing and a new seal comprising the steps of: removing the worn seal from the housing of the front pump thereby exposing a cavity in said housing, providing a bearing support ring having opposite ends, a constant diametered and coaxial aperture therein, and a step-diametered exterior surface having a first portion having a diameter substantially equal to the exterior diameter of said worn front seal, a second portion having a diameter smaller than said last-mentioned diameter and a step therebetween, said ring having a groove therein communicating with said ends of said ring and said aperture, securing said ring in said cavity of said housing with said first portion of said ring adjacent to the bottom of said cavity and with said second portion and one of said ring ends spaced from the opening of said cavity with said aperture in registry with the cylindrical bushing-supporting surface of said housing thereby forming a continuation thereof, and with said groove in registry with the oil drain of said housing, providing a new cylindrical bushing having an exterior diameter substantially equal to the diameter of said ring aperture, securing said new bushing in said aperture of said ring with one end of said new bushing positioned flush with said one ring end, said new bushing being supported by said ring, providing an annular oil seal having an outer rigid ring and an inner flexible ring secured coaxially together, said outer ring having a cylindrical surface defining the outer peripheral surface of said seal, said seal surface having a diameter substantially equal to the diameter of said portion of said exterior ring surface, securing said seal in said cavity in a position to contact a portion of the converter shaft not previously contacted by said worn oil seal whereby the converter shaft can be journaled in said bushing and the oil lubricating said bushing and the shaft is retained within said pump housing and the excess oil returned to the interior of said pump housing by said oil drain.

8. The method of replacing a worn torque converter shaft bushing and a front oil pump seal of an automatic transmission with a longer bushing and a new seal comprising the steps of: removing the worn oil seal from the housing of the front pump thereby exposing a cavity in said housing, removing the worn bushing from said housing, providing a bearing support ring having opposite ends, a constant diametered coaxial aperture therein, an exterior surface having a constant diametered surface portion with a diameter substantially equal to the exterior diameter of said worn front seal, and a second opening therein communicating with said ends, securing said ring in said cavity of said housing adjacent to the bottom thereof and spaced from the opening of said cavity, with said aperture in registry with the cylindrical bushing-supporting surface of said housing thereby forming a continuation thereof and with said second opening in registry with the oil drain of said housing, providing a new cylindrical bushing having an exterior diameter substantially equal to the diameter of said ring aperture, securing said new bushing in said aperture of said ring in a position to contact a portion of the converter shaft not previously contacted by said worn bushing, said new bushing being supported by said ring, providing a new annular oil seal having an outer rigid ring and an inner flexible ring secured coaxially together, said outer ring having a cylindrical surface defining the outer peripheral surface of said seal, said seal surface having a diameter substantially equal to the diameter of said portion of said exterior ring surface, securing said seal in said cavity in a position to contact a portion of the converter shaft not previously contacted by said worn oil seal whereby the converter shaft can be journaled in said bushing and the oil lubricating said bushing and the shaft is retained within said pump housing and the excess oil returned to the interior of said pump housing by said oil drain.

No references cited.

MARTIN P. SCHWADRON, *Primary Examiner.*

R. R. BUNEVICH, *Assistant Examiner.*